(12) United States Patent
Deura et al.

(10) Patent No.: US 12,208,607 B2
(45) Date of Patent: Jan. 28, 2025

(54) IMAGE RECORDING APPARATUS, IMAGE RECORDING SYSTEM, AND COMPUTER-READABLE STORAGE MEDIUM FOR REDUCING WASTED AREA ON SHEET MEDIUM

(71) Applicant: BROTHER KOGYO KABUSHIKI KAISHA, Nagoya (JP)

(72) Inventors: Yushi Deura, Nagoya (JP); Taisei Okuzono, Nagoya (JP); Haruka Azechi, Nagoya (JP); Yasuhiro Nakano, Nagoya (JP); Gakuro Kanazawa, Toyokawa (JP); Yuki Tsujimura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 131 days.

(21) Appl. No.: 18/158,453

(22) Filed: Jan. 23, 2023

(65) Prior Publication Data
US 2023/0234381 A1 Jul. 27, 2023

(30) Foreign Application Priority Data
Jan. 24, 2022 (JP) .................................. 2022-008435

(51) Int. Cl.
*B41J 11/42* (2006.01)
(52) U.S. Cl.
CPC ...................................... *B41J 11/42* (2013.01)
(58) Field of Classification Search
CPC .......... B41J 11/42; B41J 11/70; G06F 3/1262; G06F 3/1219; G06F 3/1251; G06K 15/1823
See application file for complete search history.

(56) References Cited

U.S. PATENT DOCUMENTS

| 9,025,195 B2 * | 5/2015 | Yasinover .......... G06K 15/1809 358/1.18 |
| 2009/0316191 A1 | 12/2009 | Saito |
| 2021/0237492 A1 | 8/2021 | Watari et al. |

FOREIGN PATENT DOCUMENTS

| JP | H11-314422 A | 11/1999 |
| JP | 2005-47137 A | 2/2005 |
| JP | 2010-3078 A | 1/2010 |
| JP | 2018-176560 A | 11/2018 |
| JP | 2021-160880 A | 10/2021 |

* cited by examiner

*Primary Examiner* — Bradley W Thies
(74) *Attorney, Agent, or Firm* — KENEALY VAIDYA LLP

(57) ABSTRACT

An image recording apparatus includes a controller to calculate n that is a maximum natural number satisfying $nX \leq X_0$, where $X_0$ represents a width of a sheet medium, and X represents a longest one of respective lengths, in a width direction of the sheet medium, of a plurality of first images or a single second image based on image data. The plurality of first images are arranged along a longitudinal direction of the sheet medium. When the calculated n is equal to or more than two, the controller performs a juxtaposed image recording process to control a print engine in such a manner that two or more and n or less images, among the plurality of first images or among a plurality of divisional images into which the single second image is divided, are recorded to be arranged side by side along the width direction.

13 Claims, 10 Drawing Sheets

FIG. 6A

JUXTAPOSED IMAGE RECORDING PROCESS — 41

- 41a: Perform the juxtaposed image recording process.
- 41b: Not perform the juxtaposed image recording process.
- 41c: Make sure whether to perform the juxtaposed image recording process in advance when the juxtaposed image recording process is executable.

FIG. 6B

Do you want to perform the juxtaposed image recording process? — 42

You can reduce the wasted area on the sheet.

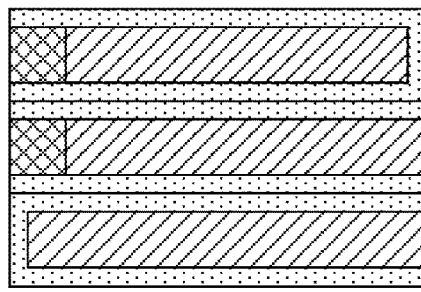

UNUSED AREA

- 42a: YES
- 42b: NO

IMAGE RECORDING APPARATUS, IMAGE RECORDING SYSTEM, AND COMPUTER-READABLE STORAGE MEDIUM FOR REDUCING WASTED AREA ON SHEET MEDIUM

REFERENCE TO RELATED APPLICATIONS

This application claims priority from Japanese Patent Application No. 2022-008435 filed on Jan. 24, 2022. The entire content of the priority application is incorporated herein by reference.

BACKGROUND ART

A printer (i.e., an image recording apparatus) has been known that is configured to record an image on a long sheet of roll paper (i.e., a sheet medium) wound in a roll shape.

DESCRIPTION

When image recording is performed on the roll paper as described above, it is possible to record an image that is longer in a longitudinal direction of the sheet than when the image recording is performed on regular-size cut paper (e.g., A-size cut paper or B-size cut paper). On the other hand, when an image is recorded on the roll paper, if the image to be recorded has a length equal to or less than half the width of the roll paper in a width direction of the sheet, it will result in a large wasted area (in which no image is recorded) on the roll paper.

Aspects of the present disclosure are advantageous to provide one or more improved techniques that make it possible to reduce a wasted area on a sheet medium.

According to aspects of the present disclosure, an image recording apparatus is provided, which includes a print engine, a first storage device, and a controller. The print engine is configured to perform image recording on a sheet medium based on image data. The first storage device is configured to store a width of the sheet medium. The controller is configured to calculate n that is a maximum natural number satisfying $nX \leq X_0$ among natural numbers equal to or more than one, where $X_0$ represents the width of the sheet medium that is stored in the first storage device, and X represents a longest one of respective lengths, in a width direction of the sheet medium, of a plurality of first images or a single second image based on the image data. The plurality of first images are arranged along a longitudinal direction of the sheet medium and separated by cutting planned lines along a width direction of the sheet medium. The controller is further configured to, when the calculated n is equal to or more than two, perform a juxtaposed image recording process to control the print engine in such a manner that two or more and n or less images, among the plurality of first images or among a plurality of divisional images into which the single second image is divided by dividing lines along the width direction of the sheet medium, are recorded to be arranged side by side along the width direction of the sheet medium.

According to aspects of the present disclosure, further provided is an image recording system that includes a print engine, a storage device, and a controller. The print engine is configured to perform image recording on a sheet medium based on image data. The storage device is configured to store a width of the sheet medium. The controller is configured to calculate n that is a maximum natural number satisfying $nX \leq X_0$ among natural numbers equal to or more than one, where $X_0$ represents the width of the sheet medium that is stored in the storage device, and X represents a longest one of respective lengths, in a width direction of the sheet medium, of a plurality of first images or a single second image based on the image data. The plurality of first images are arranged along a longitudinal direction of the sheet medium and separated by cutting planned lines along a width direction of the sheet medium. The controller is further configured to, when the calculated n is equal to or more than two, perform a juxtaposed image recording process to control the print engine in such a manner that two or more and n or less images, among the plurality of first images or among a plurality of divisional images into which the single second image is divided by dividing lines along the width direction of the sheet medium, are recorded to be arranged side by side along the width direction of the sheet medium.

According to aspects of the present disclosure, further provided is a non-transitory computer-readable storage medium storing computer-readable instructions executable by a controller of an image recording system. The image recording system includes a print engine configured to perform image recording on a sheet medium based on image data. The image recording system further includes a storage device configured to store a width of the sheet medium. The instructions are configured to, when executed by the controller, cause the image recording system to calculate n that is a maximum natural number satisfying $nX \leq X_0$ among natural numbers equal to or more than one, where $X_0$ represents the width of the sheet medium that is stored in the storage device, and X represents a longest one of respective lengths, in a width direction of the sheet medium, of a plurality of first images or a single second image based on the image data. The plurality of first images are arranged along a longitudinal direction of the sheet medium and separated by cutting planned lines along a width direction of the sheet medium. The instructions are further configured to, when executed by the controller, cause the image recording system to, when the calculated n is equal to or more than two, perform a juxtaposed image recording process to control the print engine in such a manner that two or more and n or less images, among the plurality of first images or among a plurality of divisional images into which the single second image is divided by dividing lines along the width direction of the sheet medium, are recorded to be arranged side by side along the width direction of the sheet medium.

FIG. 6A shows a setting screen for juxtaposed image recording displayed on a display.

FIG. 6B shows a notification screen displayed on the display.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, a printer 1 of an illustrative embodiment according to aspects of the present disclosure will be described with reference to the accompanying drawings. In the following description, a vertical direction, a front-to-rear direction, and a left-to-right direction shown in FIG. 1 will be defined as a front-to-rear direction, and a left-to-right direction of the printer 1, respectively. It is noted that hereinafter, each of the above directions may represent two mutually-opposite directions along each individual direction. Specifically, for instance, the vertical direction may represent both the upward direction and the downward direction that are along the vertical direction. Further, the front-to-rear direction may represent both the frontward direction and the rearward direction that are along the front-to-rear direction. Moreover, the left-to-right direction may represent both the leftward direction and the rightward direction that are along the left-to-right direction.

Figure 1:
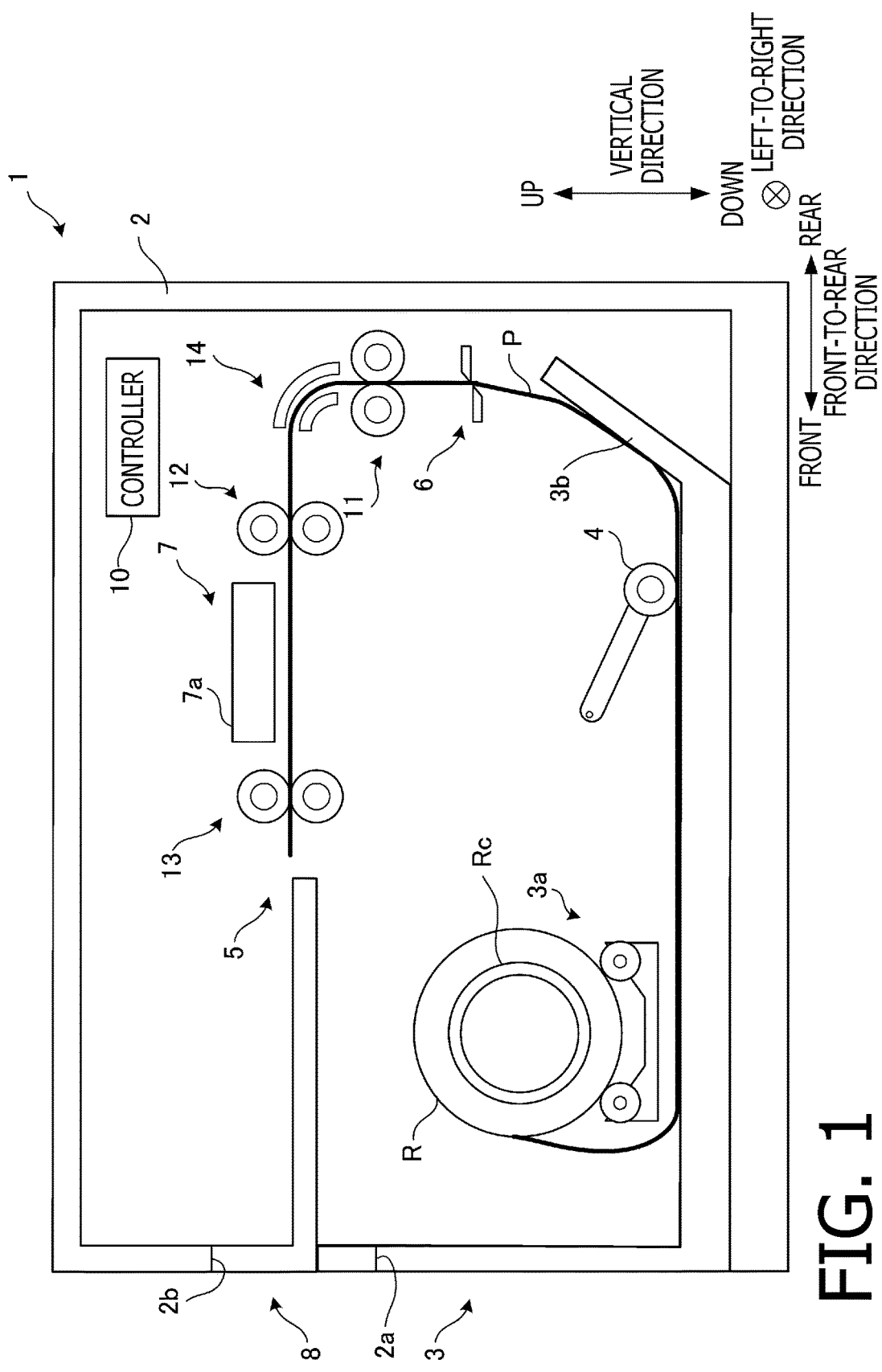
FIG. 1 is a cross-sectional side view schematically showing an internal configuration of a printer.

As shown in FIG. 1, the printer 1 includes a housing 2, a feed tray 3, a pick-up roller 4, a conveyor 5, a cutter 6, an image recorder 7, a discharge tray 8, and a controller 10.

The feed tray 3 is disposed below the image recorder 7 in the housing 2. The feed tray 1 is configured to be inserted into and removed from the housing 2 along the front-to-rear direction through an opening 2a formed in a front wall of the housing 2. The feed tray 3 accommodates a roll body R. The feed tray 3 has a roll body supporter 3a configured to support the roll body R. The feed tray 3 may be configured to accommodate cut paper as well as the roll body R. The roll body R is a long sheet P wound in a roll shape around an outer circumference of a cylindrical winding core Rc.

The pick-up roller 4 is configured to feed, from the feed tray 3, the sheet P unwound from the roll body R supported by the roll body supporter 3a. The pick-up roller 4 is driven to rotate by a feed motor 4a (see FIG. 2). When the feed motor 4a is driven by the controller 10, the pick-up roller 4 rotates, and a feeding force in a direction from the front toward the rear is given to the sheet P that is in contact with the pick-up roller 4. Thereby, the sheet P is fed from the feed tray 3. A rear wall 3b provided at a rear end portion of the feed tray 3 is inclined in such a manner that an upper end of the rear wall 3b is located rearward of a lower end of the rear wall 3b. Therefore, the sheet P from the feed tray 3 is fed obliquely upward.

The conveyor 5 is configured to convey the sheet P in a conveyance direction. The conveyor 5 includes two intermediate rollers 11, two conveyance rollers 12, two discharge rollers 13, and a guide 14.

The intermediate rollers 11 include a driving roller and a driven roller. The driving roller is driven to rotate by an intermediate motor 11a (see FIG. 2). The driven roller is configured to rotate according to the rotation of the driving roller. When the intermediate motor 11a is driven by the controller 10, the intermediate rollers 11 rotate while holding the sheet P therebetween, thereby conveying the sheet P. The intermediate rollers 11 are disposed above a rear end portion of the feed tray 3. The intermediate rollers 11 convey the sheet P upward while holding therebetween the sheet P that has been fed obliquely upward from the feed tray 3 by the pick-up roller 3. The guide 14 is disposed above the intermediate rollers 11. The guide 14 is configured to guide forward the sheet P that is conveyed upward by the intermediate rollers 11.

The conveyance rollers 12 include a driving roller and a driven roller. The driving roller is driven to rotate by a conveyance motor 12a (see FIG. 2). The driven roller is configured to rotate according to the rotation of the driving roller. The discharge rollers 13 include a driving roller and a driven roller. The driving roller is driven to rotate by a discharge motor 13a (see FIG. 2). The driven roller is configured to rotate according to the rotation of the driving roller. When the conveyance motor 12a is driven by the controller 10, the conveyance rollers 12 rotate while holding the sheet P therebetween, thereby conveying the sheet P. Likewise, when the discharge motor 13a is driven by the controller 10, the discharge rollers 13 rotate while holding the sheet P therebetween, thereby conveying the sheet P. The conveyance rollers 12 are disposed rearward of the image recorder 7. The discharge rollers 13 are disposed in front of the image recorder 7. The conveyance rollers 12 convey the sheet P forward while holding therebetween the sheet P that has been guided forward by the guide 14. The discharge rollers 13 convey the sheet P toward the discharge tray 8 while holding therebetween the sheet P that has been conveyed forward by the conveyance rollers 14.

The cutter 6 is disposed between the rear end portion of the feeding tray 3 and the intermediate rollers 11. For instance, the cutter 6 includes a disk-shaped rotary blade and a driven blade. When driven by a cutting motor 6a (see FIG. 2), the rotary blade of the cutter 6 rotates, and reciprocates along the left-to-right direction. The sheet P, unwound from the roll body R and conveyed, is cut along a width direction of the sheet P by the cutter 6 when the cutting motor 6a is driven by the controller 10.

The image recorder 7 is configured to record an image on the sheet P based on image data. The image recorder 7 performs image recording on the sheet P being conveyed by the conveyor 5 after being fed from the feed tray 3 by the pick-up roller 4. The image recorder 7 includes a head 7a. The head 7a has a plurality of nozzles (not shown) formed on a lower surface of the head 7a, and a driver IC (not shown). The head 7a is configured to, when the driver IC is driven by the controller 10, eject ink from the nozzles, thereby recording an image on the sheet P when the sheet P being conveyed by the conveyor 5 passes an image recording position opposed to the lower surface of the head 7a in the vertical direction. The head 7a may be a line type head to eject ink from the nozzles in a fixed position, or may be a serial type head to eject ink from the nozzles while moving along the left-to-right direction.

The discharge tray 8 is disposed in front of the image recorder 7 and above the feed tray 3 in the housing 2. The discharge tray 8 is configured to be inserted into and removed from the housing 2 through an opening 2b formed in the front wall of the housing 2. The sheet P with an image recorded thereon by the image recorder 7 is discharged onto and received by the discharge tray 8.

Figure 2:
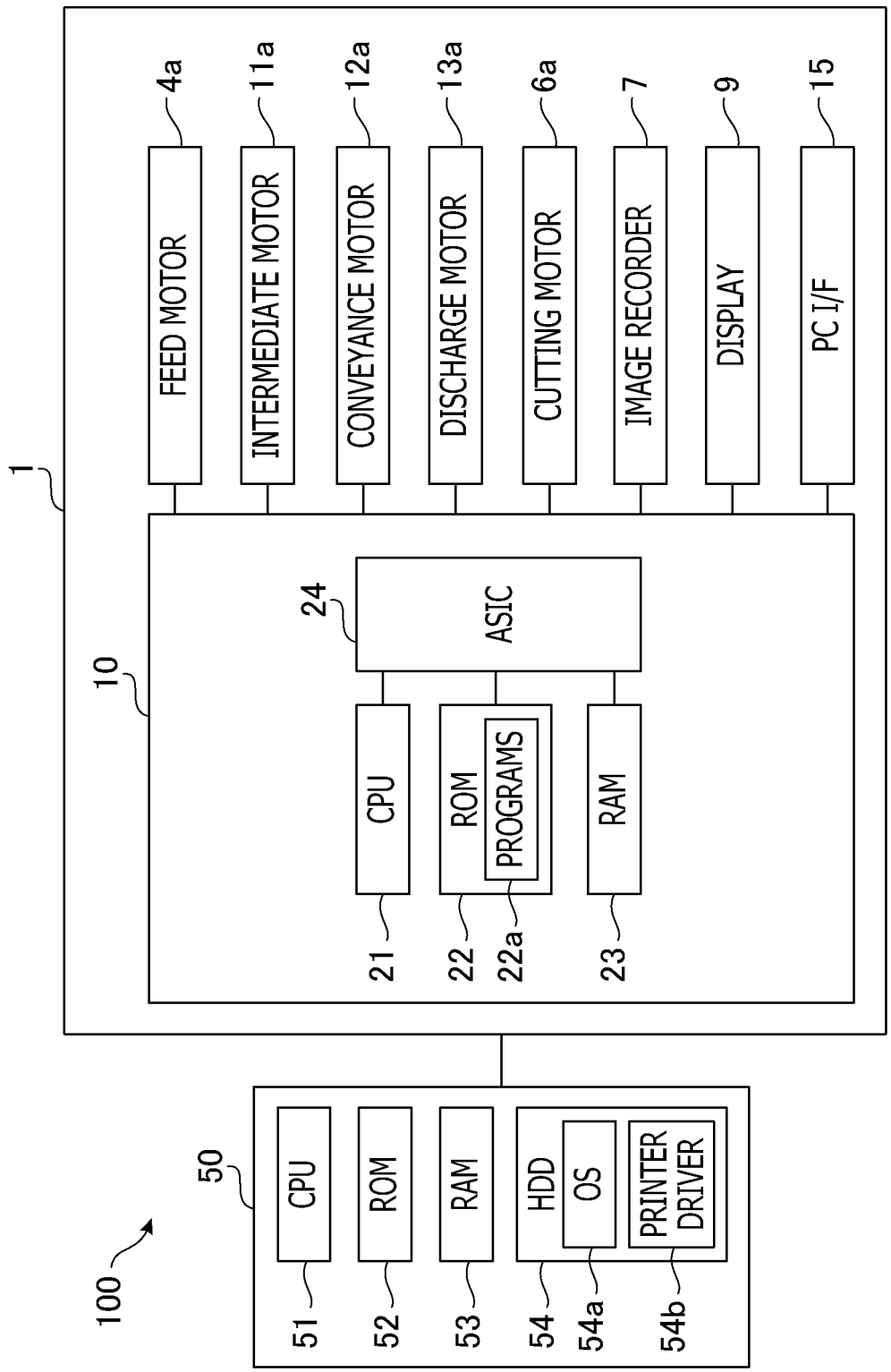
FIG. 2 is a block diagram schematically showing an electrical configuration of an image recording system including the printer and a PC ("PC" is an abbreviation for "Personal Computer").

The controller 10 is configured to take overall control of the printer 1. As shown in FIG. 2, the controller 10 are electrically connected with the feed motor 4a, the intermediate motor 11a, the conveyance motor 12a, the discharge motor 13a, the cutting motor 6a, the image recorder 7, and a display 9.

The display 9 is disposed on an outer surface of the housing 2. The display 9 is of a touch panel type. The display 9 is configured to display various information about the printer 1 and provide notifications to the user. The display 9 is further configured to receive inputs by user operations.

As shown in FIG. 2, the controller 10 includes a CPU ("CPU" is an abbreviation for "Central Processing Unit") 21, a ROM ("ROM" is an abbreviation for "Read Only Memory") 22, a RAM ("RAM" is an abbreviation for "Random Access Memory") 23, and an ASIC ("ASIC" is an abbreviation for "Application Specific Integrated Circuit") 24. The ROM 22 stores therein programs 22a executable by the CPU 21 and the ASIC 24, and various types of fixed data. The RAM 23 is configured to temporarily store data necessary for the programs 22a to be executed. The above elements included in the controller 10 collaborate with each other, thereby controlling the feed motor 4a, the intermediate motor 11a, the conveyance motor 12a, the discharge motor 13a, the cutting motor 6a, the image recorder 7, and the display 9.

In the illustrative embodiment, the RAM 23 stores a width of the sheet P on which image recording is performed. For instance, the width of the sheet P is input by the user. In another instance, the printer 1 may have a sensor to detect the width of the sheet P. In this case, the width of the sheet P detected by the sensor may be stored in the RAM 23.

In addition, the RAM 23 stores original image data input via an external device. Examples of the external device may include, but are not limited to, a PC ("PC" is an abbreviation for "Personal Computer") 50 (see FIG. 2) that is connected with the printer 1 as will be described below, a USB memory connected via a USB interface (not shown), and a smartphone connected via a wireless LAN module (not shown). In addition, when an after-mentioned juxtaposed image recording process is performed, the RAM 23 stores juxtaposed image data for juxtaposed images.

FIG. 2 shows a single CPU 21 and a single ASIC 25. In another instance, however, the controller 10 may include only the single CPU 21. In this case, the single CPU 21 may unitarily perform all necessary processing. In yet another instance, the controller 10 may include a plurality of CPUs 21. In this case, the plurality of CPUs 21 may perform the necessary processing in a shared manner. In yet another instance, the controller 10 may include only the single ASIC 25. In this case, the single ASIC 25 may unitarily perform all the necessary processing. In yet another instance, the controller 10 may include a plurality of ASICs 25. In this case, the plurality of ASICs may perform the necessary processing in a shared manner.

As shown in FIG. 2, the printer 1 further includes a PC I/F ("I/F" is an abbreviation for "interface") 15 configured to make a wired or wireless connection with a PC 50. An image recording system 100 includes the printer 1 and the PC 50 connected with the printer 1. The image recording system 100 may include a plurality of PCs 50. The PC 50 includes a CPU 51, a ROM 52, a RAM 53, and an HDD ("HDD" is an abbreviation for "Hard Disk Drive") 54. The HDD 54 has an OS ("OS" is an abbreviation for "Operating System") 54a and a printer driver 54b installed. The printer driver 54b is configured to, when executed by the CPU 51, cause the CPU 51 to control the printer 1.

Images to be recorded on the sheet P unwound from the roll body R will be described using three patterns as examples. First, a first pattern will be explained with reference to FIG. 3A. The first pattern is formed with a plurality of images A that form a plurality of copies. The plurality of images A are arranged along the longitudinal direction of the sheet P. The plurality of images A are separated by cutting planned lines L1 that are along the width direction (i.e., a direction orthogonal to the longitudinal direction) of the sheet P. Each image A includes an image area 31 and a margin area 32. The image area 31 is an area in which characters and/or pictures are placed. The margin area 32 is an area which is provided around the image area 31.

Next, a second pattern will be explained with reference to FIG. 3B. The second pattern is formed with a plurality of images B that form a plurality of pages. The plurality of images B include four images B1, B2, B3, and B4. The plurality of images B are arranged along the longitudinal direction of the sheet P. The plurality of images B are separated by cutting planned lines L1 that are along the width direction (i.e., the direction orthogonal to the longitudinal direction) of the sheet P. In substantially the same manner as the images A, each image B includes an image area 31 in which characters and/or pictures are placed, and a margin area 32 provided around the image area 31. A single printed sheet is formed by each image B being recorded on the sheet P.

In this example, the plurality of images B are different in size from each other. With respect to lengths (hereinafter, which may be referred to simply as "widths") of the images B in the width direction of the sheet P, the image B2 has the largest width. However, the plurality of images B may have the same size as each other.

Finally, a third pattern will be explained with reference to FIG. 3C. The third pattern is formed with a single image C. In substantially the same manner as the images A, the image C includes an image area 31 in which characters and/or pictures are placed, and a margin area 32 provided around the image area 31. A single printed sheet is formed by the image C being recorded on the sheet P. In FIG. 3C, a one-side end (specifically, a left end in FIG. 3C) of the image C in the longitudinal direction of the sheet P will be defined as a "leading end" of the image C. Further, the other-side end (specifically, a right end in FIG. 3C) of the image C in the longitudinal direction of the sheet P will be defined as a "trailing end" of the image C. It is noted that hereinafter, a left side and a right side of something (e.g., one or more images) in FIGS. 3A-3C, 4A-4B, 5A-5C, and 9A-9C may be referred to as "one side" and the "other side" in the longitudinal direction of the sheet P, respectively. Further, a left end and a right end of something (e.g., one or more images) in FIGS. 3A-3C, 4A-4B, 5A-5C, and 9A-9C may be referred to as a "one-side end" and the "other-side end" in the longitudinal direction of the sheet P, respectively. Likewise, an upper side and a lower side of something (e.g., one or more images) in FIGS. 3A-3C, 4A-4B, 5A-5C, and 9A-9C may be referred to as "one side" and the "other side" in the width direction of the sheet P, respectively. Further, an upper end and a lower end of something (e.g., one or more images) in FIGS. 3A-3C, 4A-4B, 5A-5C, and 9A-9C may be referred to as a "one-side end" and the "other-side end" in the width direction of the sheet P, respectively.

Subsequently, referring to FIGS. 4A-4B and 5A-5C, specific processes to be performed by the controller 10 of the printer 1 will be described.

The controller 10 performs a calculation process based on the width of the roll paper Rp that is stored in the RAM 23, and the original image data. In the calculation process, the controller 10 calculates n that is the maximum natural number satisfying the relationship $nX \leq X_0$ among natural numbers equal to or more than one. Here, $X_0$ represents the width of the roll paper Rp. Further, X represents the longest one of respective lengths (i.e., widths), in the width direction of the sheet P, of the images based on the original image data. When the images based on the original image data are in the first pattern (the plurality of images A (see FIG. 3A) that form the plurality of copies), let the width of the images A be X. When the images based on the original image data are in the second pattern (the plurality of images B (see FIG. 3B) that form the plurality of pages), let the width of an image (e.g., the image B2 in the example shown in FIG. 3B) having the largest width among the plurality of images B be X. When the image based on the original image data is in the third pattern (the single image C (see FIG. 3C)), let the width of the image C be X.

Figure 3A:
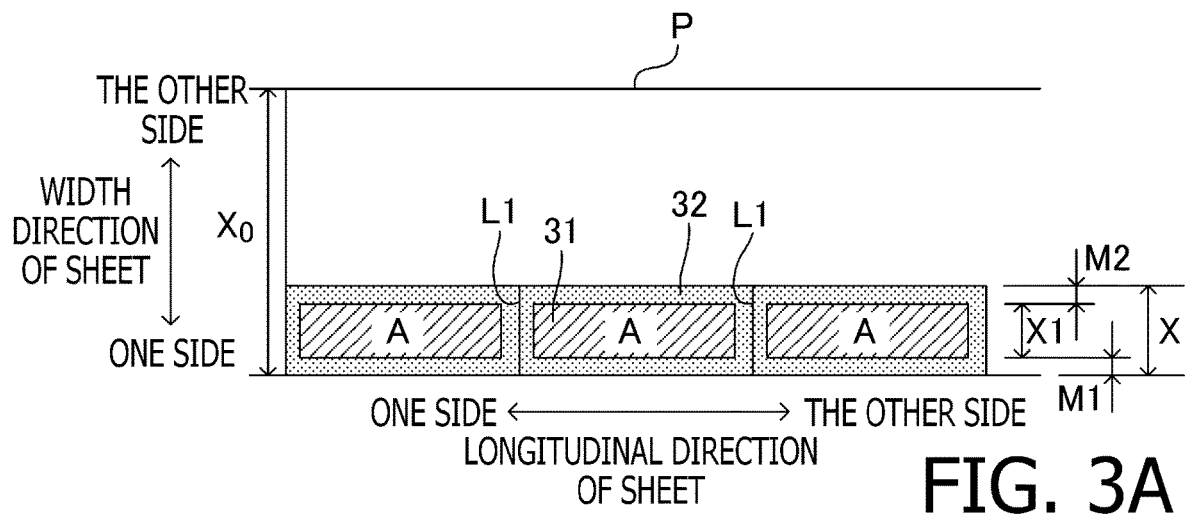
FIG. 3A shows a first pattern for a plurality of images A, to be recorded on a sheet, which form a plurality of copies.
Figure 3B:
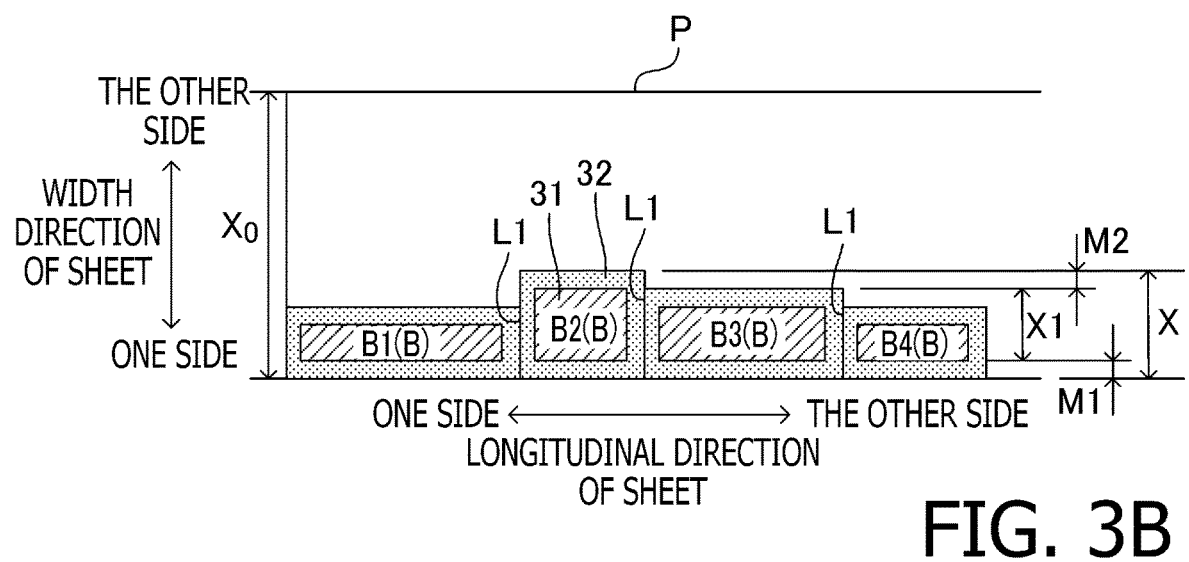
FIG. 3B shows a second pattern for a plurality of images B, to be recorded on the sheet, which forms a plurality of pages.
Figure 3C:
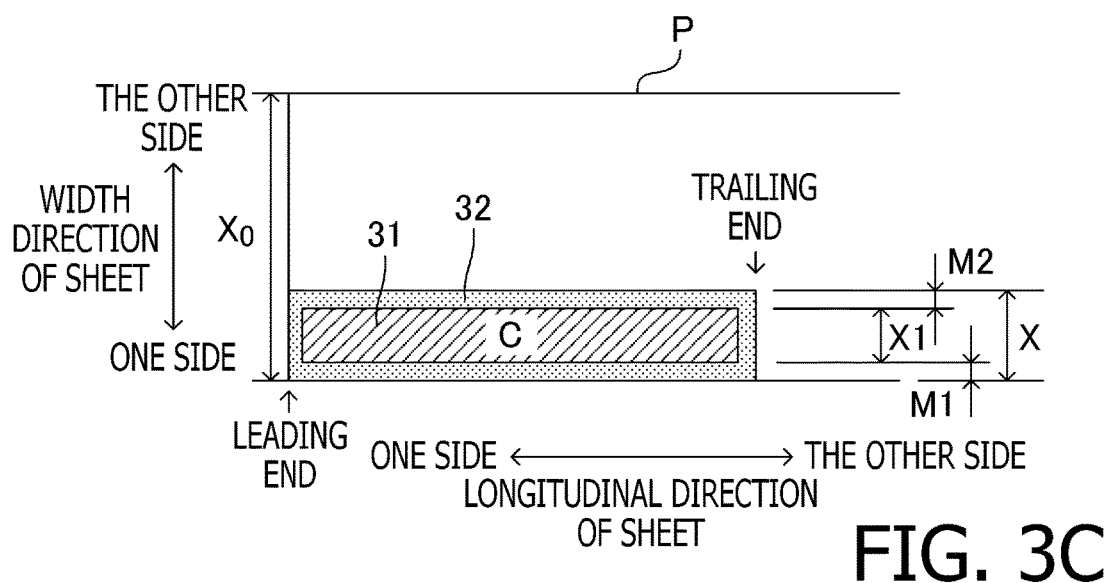
FIG. 3C shows a third pattern for a single image C to be recorded on the sheet.

Here, as shown in FIGS. 3A-3C, let a width (i.e., a length in the width direction of the sheet P) of the image area 31 of the image A, the image B2, and the image C be X1. Further, let widths (i.e., lengths in the width direction of the sheet P) of both side portions, in the width direction, of the margin area 32 surrounding the image area 31 be M1 and M2. In this case, in the calculation process, the controller 10 calculates n that is the maximum natural number satisfying the relationship $n(X1+M1+M2) \leq X_0$ among the natural numbers equal to or more than one. The calculated n represents a maximum juxtaposed image count, i.e., the maximum number of images A, B or after-mentioned divisional images Cd that are allowed to be arranged side by side along the width direction of the sheet P.

When n calculated in the calculation process is equal to or more than two, the controller 10 divides the single image C into n divisional images C1, C2, ..., Cn. In the following description, the n divisional images C1, C2, ..., Cn may be referred to as "divisional images Cd" collectively without being distinguished from each other. More specifically, in the dividing process, as shown in FIG. 4B, the single image C is divided by dividing lines L2 along the width direction of the sheet P into the n divisional images C1, C2, ..., Cn. In the example shown in FIG. 4B, n is equal to 3 (n=3).

Further, the controller 10 performs an overlap margin insertion process, in which as shown in FIG. 4B, each of (n−1) overlap margin areas 33 is placed between adjacent two of then divisional images C1, C2, ..., Cn into which the single image C has been divided in the dividing process. Namely, each overlap margin area 33 is placed between a trailing end of one divisional image Cd and a leading end of the other divisional image Cd, of a corresponding couple of adjacent divisional images Cd.

In the dividing process, the controller 10 divides the single image C, in which the (n−1) overlap margin areas 33 have been inserted in the overlap margin insertion process, into n equal sections in the longitudinal direction of the sheet P. Namely, the plurality of divisional images Cd have the same length in the longitudinal direction of the sheet P.

Figure 4A:
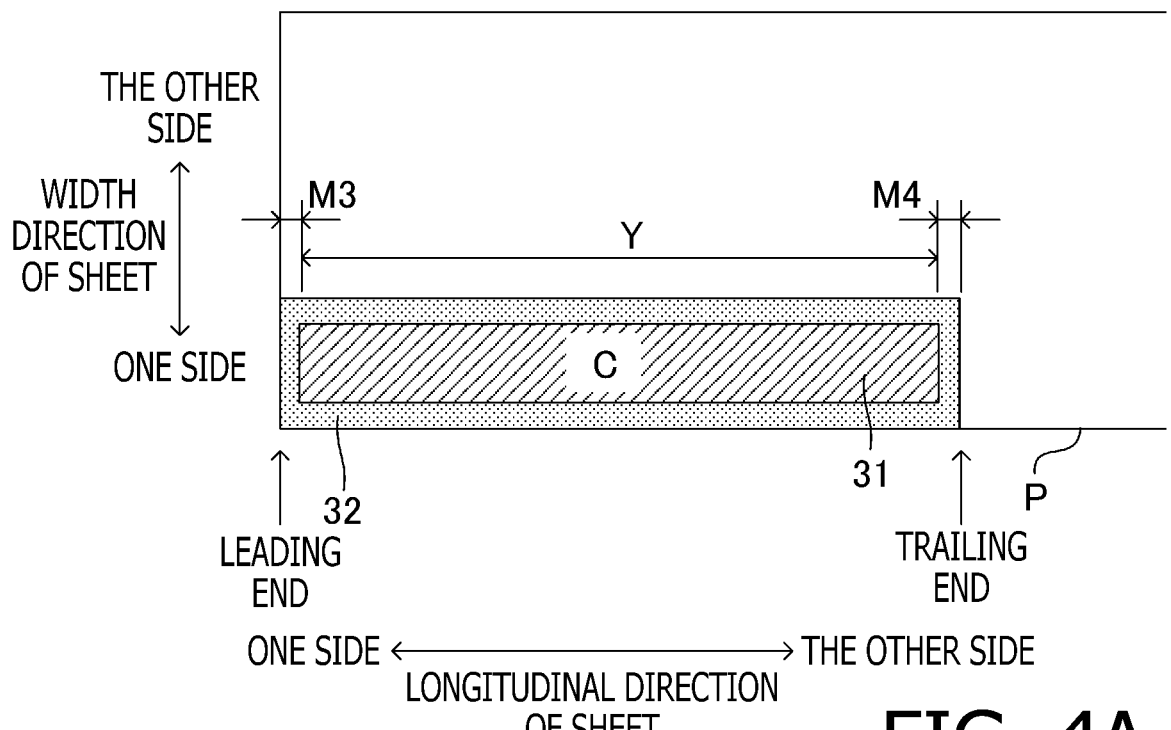
FIG. 4A shows the single image C before a dividing process.
Figure 4B:
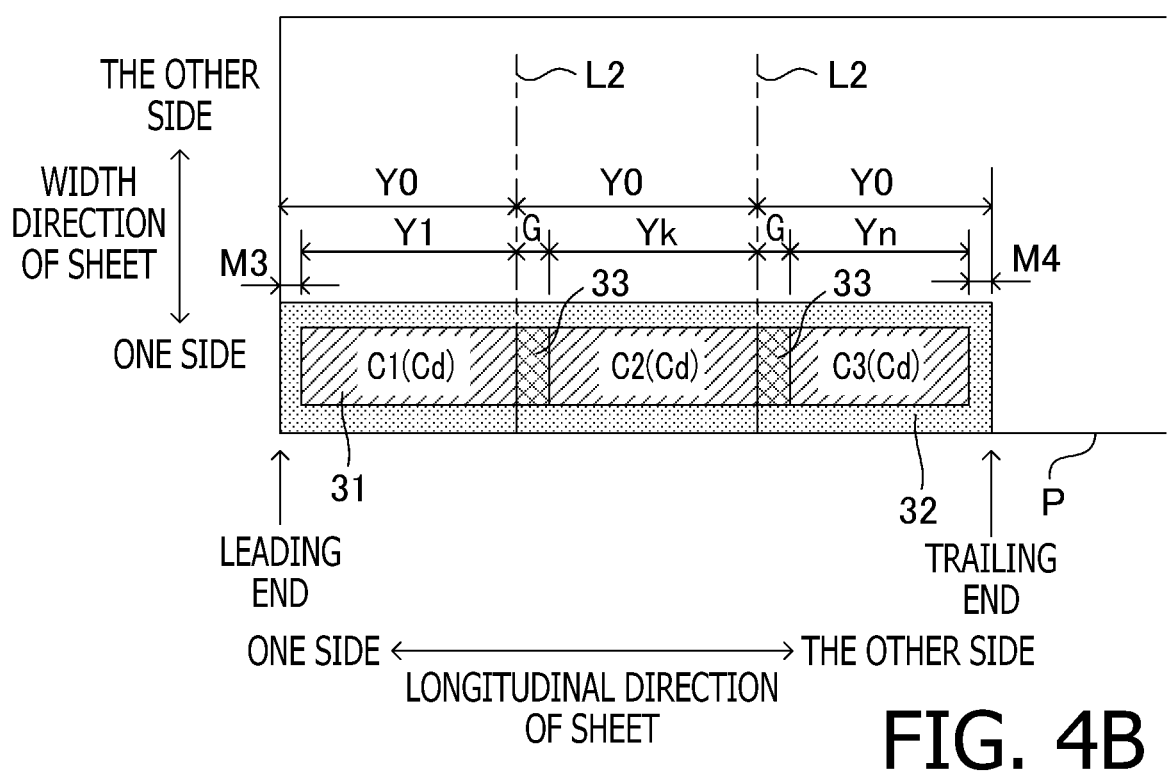
FIG. 4B shows the single image C divided into a plurality of divisional images Cd in the dividing process.

Here, as shown in FIG. 4A, let a length, in the longitudinal direction of the sheet P, of the image area 31 of the image C before the overlap margin areas 33 are inserted therein be Y. Further, let widths (i.e., lengths in the longitudinal direction of the sheet P) of both side portions of the margin areas 32 in the longitudinal direction of the sheet P be M3 and M4. Further, as shown in FIG. 4B, let lengths of the overlap margin areas 33 in the longitudinal direction of the sheet P be G. In this case, a length, in the longitudinal direction of the sheet P, of the image C in which the (n−1) overlap margin areas 33 have been inserted in the overlap margin insertion process is expressed as (Y+M3+M4+G (n−1)). Accordingly, a length Y0, in the longitudinal direction of the sheet P, of each of the n divisional images Cd into which the single image C is divided in the dividing process is expressed as Y0=(Y+M3+M4+G (n−1))/n.

As shown in FIG. 4B, let a length, in the longitudinal direction of the sheet P, of the image area 31 of the divisional image C1 that is positioned closest to the leading end (i.e., the leftmost end in FIG. 4B) among the plurality of divisional images Cd be Y1. In this case, Y0 is expressed as Y0=(M3+Y1). Namely, Y1 may be expressed as Y1={(1−n)M3+Y+M4+G (n−1)}/n.

Further, let a length, in the longitudinal direction of the sheet P, of the image area 31 of each of divisional image(s) Ck (k is a natural number satisfying 2≤k≤n−1) other than the divisional images C1 and Cn among the plurality of divisional images Cd be Yk. Here, the divisional image(s) Ck are divisional images other than the divisional images C1 and Cn among the plurality of divisional images Cd. The divisional image C1 is positioned closest to the leading end (i.e., the leftmost end in FIG. 4B) among the plurality of divisional images Cd. The divisional image Cn is positioned closest to the trailing end (i.e., the rightmost end in FIG. 4B) among the plurality of divisional images Cd. In this case, Y0 is expressed as Y0=G+Yk. Namely, Yk may be expressed as Yk=(M3+Y+M4−G)/n.

Further, let a length, in the longitudinal direction of the sheet P, of the image area 31 of the divisional image Cn that is positioned closest to the trailing end (i.e., the rightmost end in FIG. 4B) among the plurality of divisional images Cd be Yn. In this case, Y0 is expressed as Y0=G+Yn+M4. Namely, Yn may be expressed as Yn={M3+Y+(1−n)M4−G}/n.

Figure 5A:
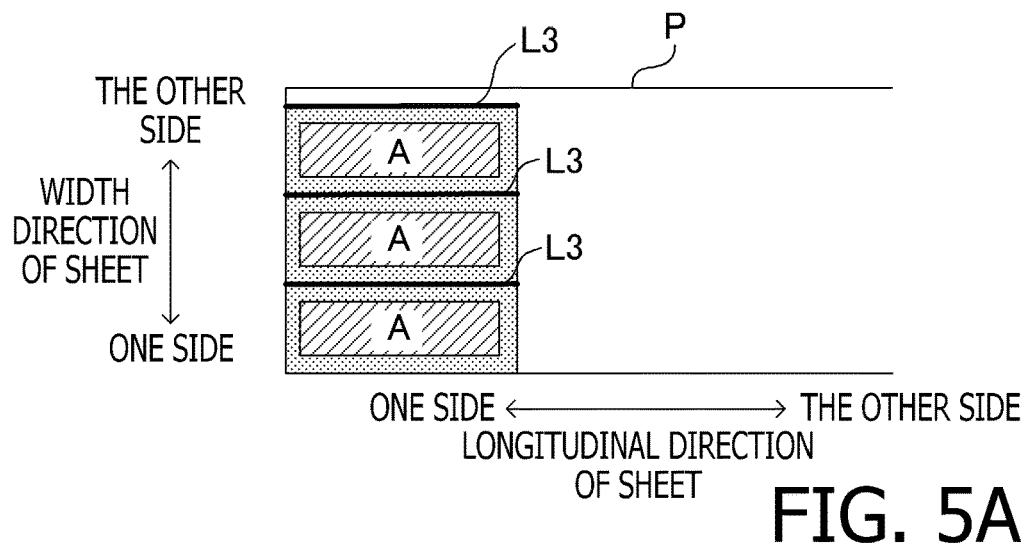
FIG. 5A shows juxtaposed images for the first pattern.

In a case where the images based on the original image data are in the first pattern (which is formed with the plurality of images A (see FIG. 3A) that form the plurality of copies), when n calculated in the calculation process is equal to or more than two, the controller 10 performs a juxtaposed image recording process to control the image recorder 7 in such a manner that two or more and n or less images among the plurality of images A are recorded to be arranged side by side along the width direction of the sheet P. Namely, in the juxtaposed image recording process, as shown in FIG. 5A, two or more and n or less same images A are recorded to be arranged side by side along the width direction of the sheet P.

In a case where the images based on the original image data are in the second pattern (which is formed with the plurality of images B (see FIG. 3B) that form the plurality of pages), when n calculated in the calculation process is equal to or more than two, the controller 10 performs a juxtaposed image recording process to control the image recorder 7 in such a manner that two or more and n or less images among the plurality of images B are recorded to be arranged side by side along the width direction of the sheet P. Namely, in the juxtaposed image recording process, as shown in FIG. 5B, two or more and n or less images B, of which any two adjacent images B in the width direction of the sheet P are for respective different pages, are recorded to be arranged side by side along the width direction of the sheet P.

Figure 5B:
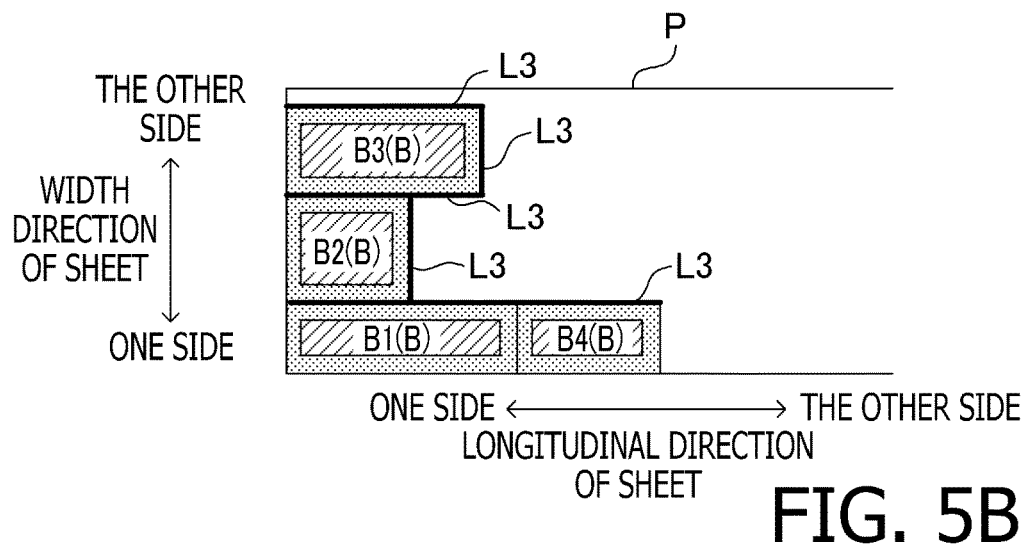
FIG. 5B shows juxtaposed images for the second pattern.

In the example shown in FIG. 5B, n is equal to 3 (i.e., n=3), and the plurality of images B includes four images B1, B2, B3, and B4. In such a case, the three images B1, B2, and B3 are arranged side by side along the width direction of the sheet P. The fourth image B4 is placed on the other side of the image B1 in the longitudinal direction of the sheet P.

Figure 5C:
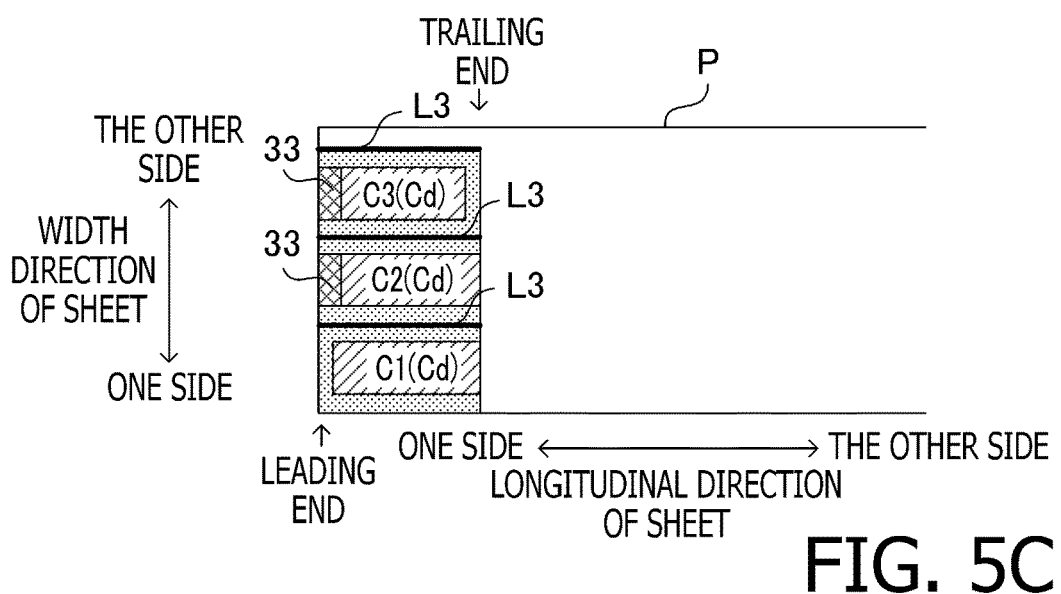
FIG. 5C shows juxtaposed images for the third pattern.

In a case where the image based on the original image data is in the third pattern (which is the single image C (see FIG. 3C)), when n calculated in the calculation process is equal to or more than two, the controller 10 performs a juxtaposed image recording process to control the image recorder 7 in such a manner that two or more and n or less images among the plurality of divisional images Cd are recorded to be arranged side by side along the width direction of the sheet P. Namely, in the juxtaposed image recording process, as shown in FIG. 5C, then divisional images C1, C2, . . . , Cn, into which the single image C has been divided in the dividing process, are recorded to be arranged side by side along the width direction of the sheet P. In this case, each overlap margin area 33 is placed at the leading end of a corresponding one of the divisional images C2, . . . , Cn, other than the divisional image C1 among the n divisional images C1, C2, . . . , Cn.

To perform the juxtaposed image recording process, the controller 10 stores in the RAM 23 juxtaposed image data for juxtaposed images that are two or more images (e.g., images A, images B, or divisional images Cd) arranged side by side along the width direction of the sheet P. Then, the controller 10 performs the juxtaposed image recording process based on the juxtaposed image data stored in the RAM 23.

In the juxtaposed image recording process, the controller 10 controls the image recorder 7 to record boundary lines L3 at boundaries of two or more images (e.g., images A, images B, or divisional images Cd) arranged side by side along the width direction of the sheet P. The boundary lines L3 are indicated by bold lines in FIGS. 5A-5C.

As shown in FIGS. 5A and 5C, when the two or more images arranged side by side along the width direction of the sheet P have the same length in the longitudinal direction of the sheet P, the boundary lines L3 are recorded, in the juxtaposed image recording process, only at boundaries that are along the longitudinal direction of the sheet P among the boundaries of the two or more images. Further, as shown in FIG. 5B, when the two or more images arranged side by side along the width direction of the sheet P have different lengths in the longitudinal direction of the sheet P, the boundary lines L3 are recorded, in the juxtaposed image recording process, at boundaries that are along the width direction of the sheet P as well as the longitudinal direction of the sheet P. Specifically, in such a case, the boundary lines L3 are recorded at boundaries, which are along the width direction of the sheet P, of images (e.g., the images B2 and B3 in the example shown in FIG. 5B) other than an image that has the longest length in the longitudinal direction of the sheet P among the two or more images arranged side by side along the width direction of the sheet P.

The printer 1 is configured to receive a setting for a mode regarding whether the juxtaposed image recording process as described above is executable. When having received an input to set the mode for the juxtaposed image recording process in response to a user operation of the touch panel type display 9, the controller 10 displays, on the display 9, a setting screen 41 (see FIG. 6A) for juxtaposed image recording.

The setting screen 41 for juxtaposed image recording has three setting buttons 41a, 41b, and 41c displayed thereon. The setting button 41a is for setting a mode to perform the juxtaposed image recording process if the juxtaposed image recording process is executable. The setting button 41b is for setting a mode to not perform the juxtaposed image recording process even if the juxtaposed image recording process is executable. The setting button 41c is for setting a mode to make sure whether to perform the juxtaposed image recording process in advance when the juxtaposed image recording process is executable. The user is allowed to set the mode for the juxtaposed image recording process by touching one of the setting buttons 41a, 41b, and 41c.

When n calculated in the calculation process is equal to or more than two, as shown in FIG. 6B, the controller 10 controls the display 9 to display a notification screen 42 to display information representing that the juxtaposed image recording process is executable in which two or more images (e.g., images A, images B, or divisional images Cd) are recorded to be arranged side by side along the width direction of the sheet P. The notification screen 42 has input buttons 42a and 42b displayed thereon. The input button 42a is configured to, when operated, input an instruction to execute the juxtaposed image recording process. The input button 42b is configured to, when operated, input an instruction to not execute the juxtaposed image recording process.

The controller 10 performs the juxtaposed image recording process when having accepted, via the display 9, the input of an instruction to perform the juxtaposed image recording process in which two or more images (e.g., images A, images B, or divisional images Cd) are recorded to be arranged side by side along the width direction of the sheet P, in response to a user's touch operation of the input button 42a on the notification screen 42 displayed on the touch panel type display 9.

The controller 10 performs a capacity determination process to determine whether there is free space in the RAM 23. In the capacity determination process, the controller 10 secures a capacity for storing the juxtaposed image data for the juxtaposed images, and then determines whether there is sufficient free space in the RAM 23.

When determining, in the capacity determination process, that there is not sufficient free space in the RAM 23, the controller 10 performs a stored data determination process to determine whether the original image data stored in the RAM 23 contains at least one page of images.

In the stored data determination process, the controller 10 performs the juxtaposed image recording process when determining that the original image data stored in the RAM 23 contains at least one page of images. Meanwhile, the controller 10 does not perform the juxtaposed image recording process when determining that the original image data stored in the RAM 23 does not contain at least one page of images.

Next, operations to be performed by the controller 10 when the printer 1 performs image recording on the sheet P will be described with reference to flowcharts shown in FIGS. 7A, 7B, and 8. Here, an explanation is provided of a case where the printer 1 performs direct printing to record images without using the printer driver 54b installed in the PC 50 (see FIG. 2). Namely, the printer 1 performs image recording based on an image recording command input directly into the printer 1 or indirectly from an external device such as a smartphone, and the original image data input from an external device such as a USB memory or a smartphone. The image recording command contains information regarding the number of copies to be recorded. It is noted that the processes shown in FIGS. 7A, 7B and 8 may be performed by the CPU 21 executing program(s) 22a stored in the ROM 22.

Figure 7A:
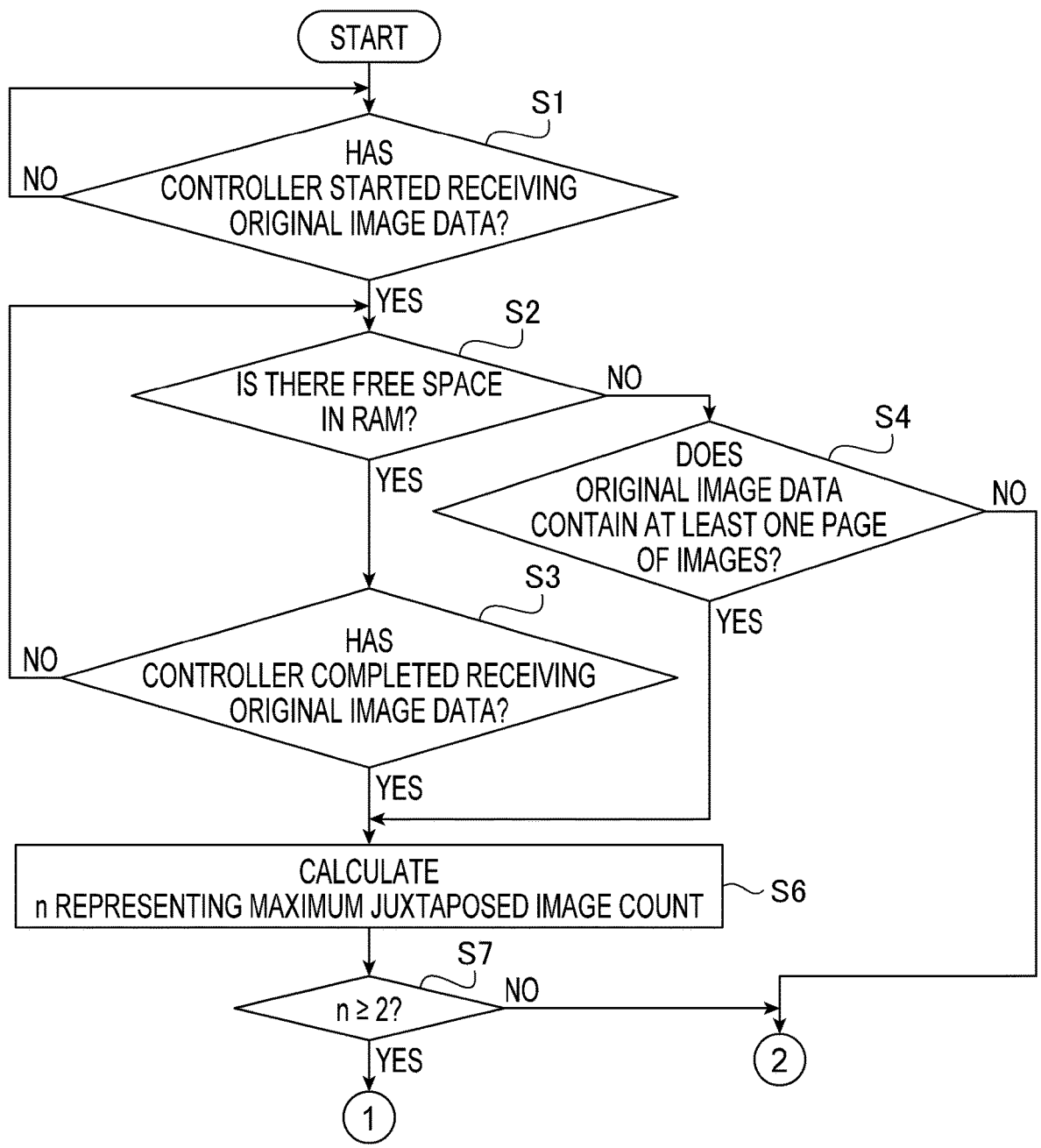
FIGS. 7A and 7B are flowcharts showing a procedure of a process to be performed by the image recording system.
Figure 7B:
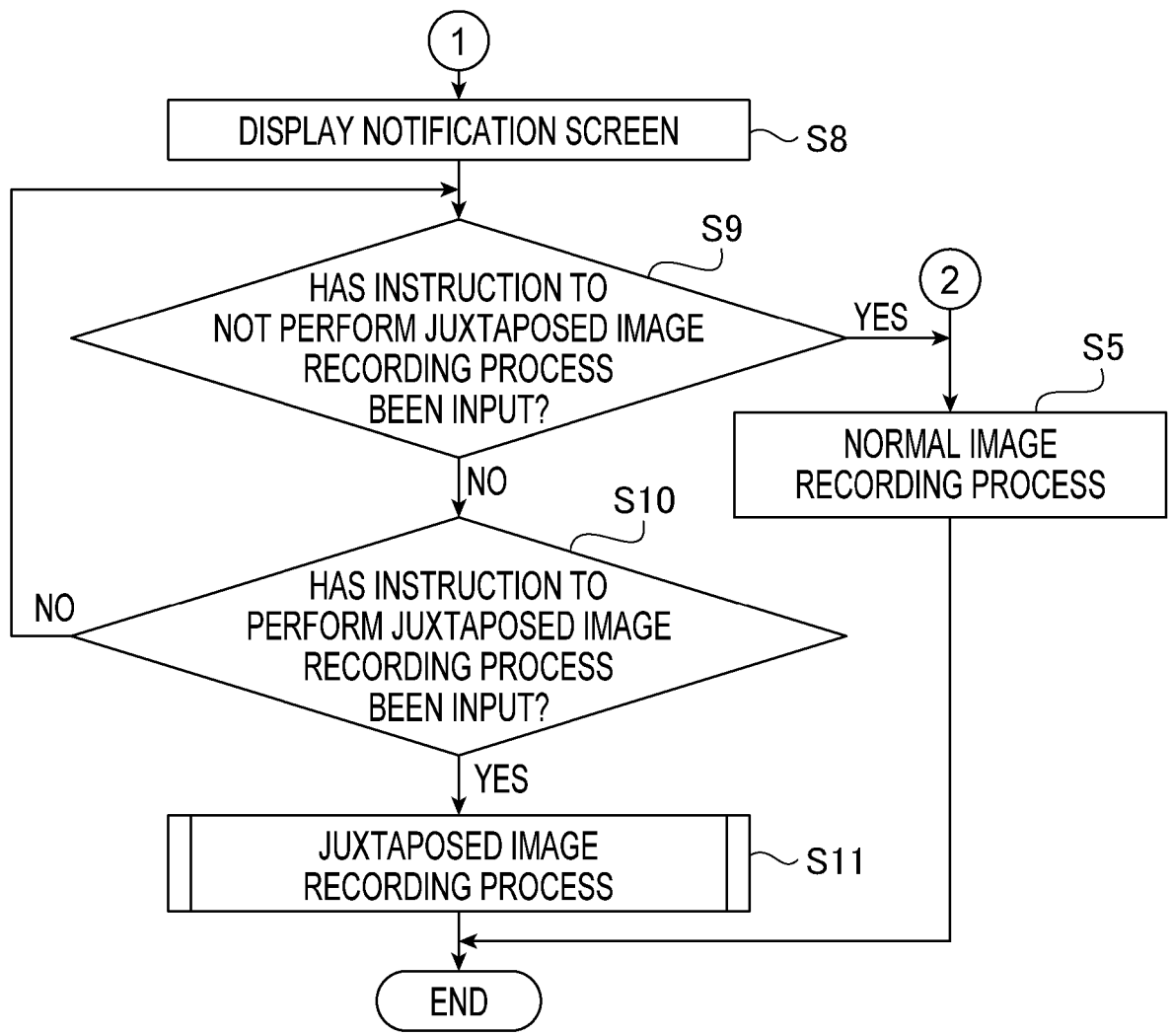
Figure 8:
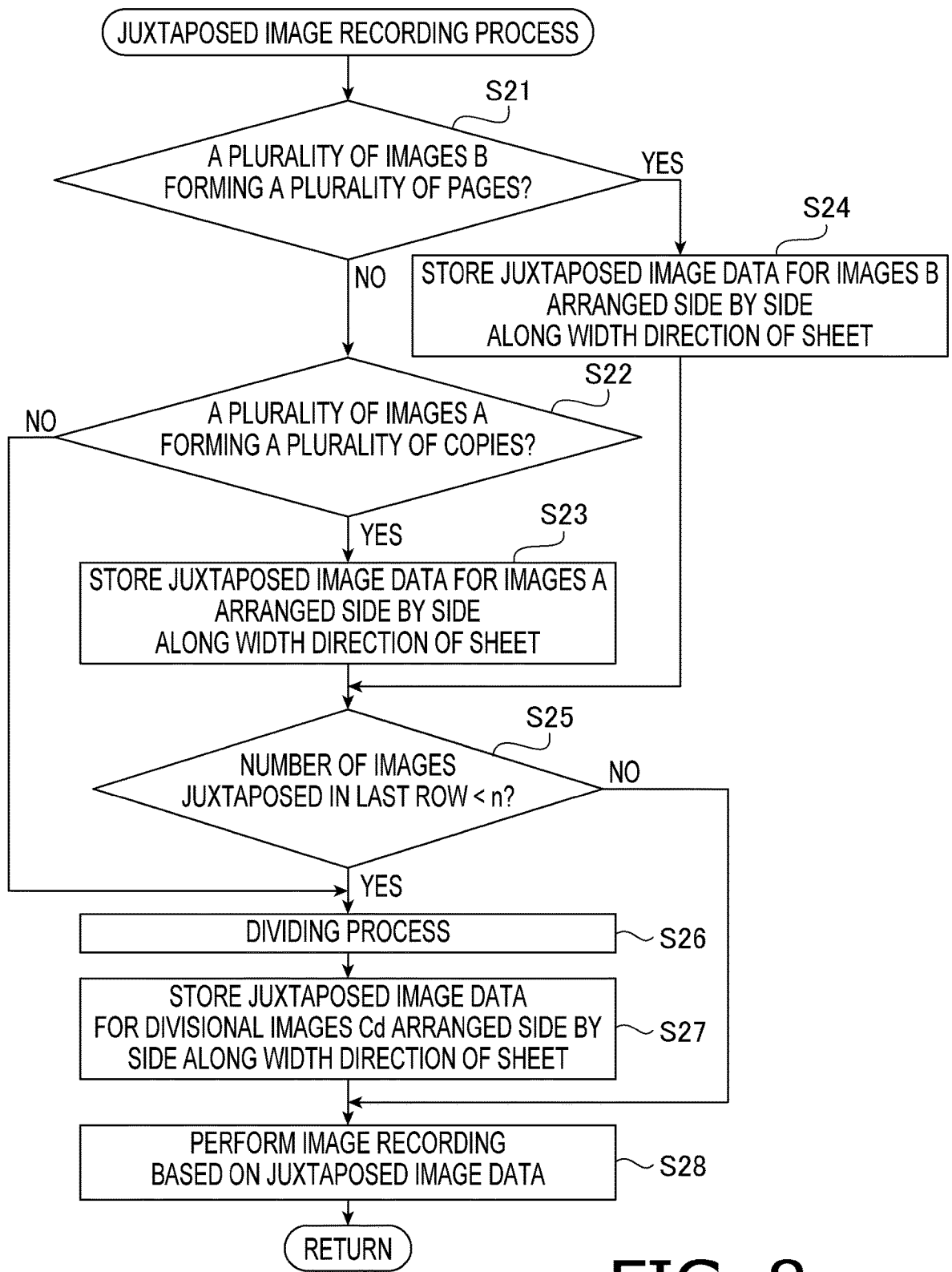
FIG. 8 is a flowchart showing a procedure of a juxtaposed image recording process.

First, as shown in FIGS. 7A and 7B, the controller 10 determines whether the controller 10 has started receiving the original image data (S1). The controller 10 repeatedly makes the determination in S1 until the controller determines that the controller 10 has started receiving the original image data. When determining that the controller 10 has started receiving the original image data (S1: Yes), the controller 10 determines whether there is sufficient free space in the RAM 23 that stores the original image data (S2: Capacity Determination Process).

When determining that there is sufficient free space in the RAM 23 (S2: Yes), the controller 10 determines whether the controller 10 has completed receiving the original image data (S3). When determining that the controller 10 has not completed receiving the original image data (S3: No), the controller 10 goes back to the aforementioned step S2. Then, when determining that the controller 10 has completed receiving the original image data (S3: Yes), the controller 10 proceeds to an after-mentioned step S6.

On the other hand, when determining that there is not sufficient free space in the RAM 23 (S2: No), the controller 10 determines whether the original image data stored in the RAM 23 contains at least one page of images (S4: Stored Data Determination Process). When determining that the original image data stored in the RAM 23 does not contain at least one page of images (S4: No), the controller 10 does not perform the juxtaposed image recording process but performs a normal image recording process (S5).

Next, the controller 10 calculates n that is the maximum juxtaposed image count, i.e., the maximum number of images A (see FIG. 3A), images B (see FIG. 3B), or divisional images Cd (see FIG. 3C) that are allowed to be arranged side by side along the width direction of the sheet P (S6: Calculation Process). Then, the controller 10 determines whether n calculated in S6 is equal to or more than two (S7). When determining that n calculated in S6 is not equal to or more than two (S7: No), the controller 10 proceeds to S5 to perform the normal image recording process. Meanwhile, when determining that n calculated in S6 is equal to or more than two (S7: Yes), the controller 10 causes the display 9 to display the notification screen 42 (see FIG. 6B) to provide a notification that the juxtaposed image recording process is executable (S8: Notification Process).

Afterward, the controller 10 determines whether the input button 42b (see FIG. 6B), displayed on the notification screen 42, for inputting an instruction to not perform the juxtaposed image recording process has been touched (S9). When determining that the input button 42b has been touched (S9: Yes), the controller 10 proceeds to the aforementioned step S5 to perform the normal image recording process. Meanwhile, wen determining that the input button 42b has not been touched (S9: No), the controller 10 determines whether the input button 42a (see FIG. 6B), displayed on the notification screen 42, for inputting an instruction to perform the juxtaposed image recording process has been touched (S10). When determining that the input button 42a has not been touched (S10: No), the controller 10 goes back to the aforementioned step S9. Meanwhile, when determining that the input button 42a has been touched (S10: Yes), the controller 10 performs the juxtaposed image recording process shown in FIG. 8 (S11).

Subsequently, a procedure of the juxtaposed image recording process will be described with reference to FIG. 8. First, the controller 10 determines whether the images based on the original image data stored in the RAM 23 are a plurality of images B (see the second pattern shown in FIG. 3B) that form a plurality of pages (S21). When determining that the images based on the original image data stored in the RAM 23 are not a plurality of images B that form a plurality of pages (S21: No), the controller 10 determines whether the images to be recorded based on an image recording command input by the user are a plurality of images A (see the first pattern shown in FIG. 3A) that form a plurality of copies (S22).

When determining that the images to be recorded are not a plurality of images A that form a plurality of copies (S22: No), the controller 10 proceeds to an after-mentioned step S26. Meanwhile, when determining that the images to be recorded are a plurality of images A that form a plurality of copies (S22: Yes), the controller 10 generates juxtaposed image data for the juxtaposed images that are the plurality of images A arranged side by side along the width direction of the sheet P, and stores the generated juxtaposed image data in the RAM 23 (S23).

Figure 9A:
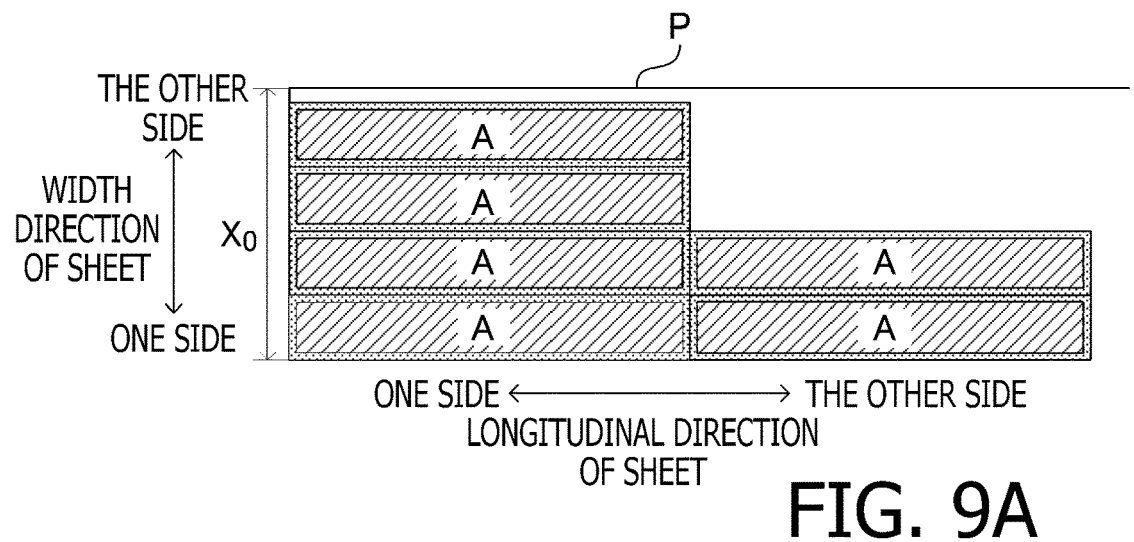
FIG. 9A shows juxtaposed images based on juxtaposed image data generated when images based on original image data are a plurality of images A forming a plurality of copies.

FIG. 9A shows an example in which there are six images A, and the maximum juxtaposed image count is 4. In this case, in the juxtaposed images, four images A arranged side by side along the width direction of the sheet P are placed at a one-side end portion (i.e., a left end portion in FIG. 9A) in the longitudinal direction of the sheet P. The four images A arranged side by side along the width direction in the sheet P are placed closely to a one-side end (i.e., a lower end in FIG. 9A) in the width direction of the sheet P.

Then, the remaining two images A are arranged side by side along the width direction of the sheet P, at the other side (i.e., the right side in FIG. 9A), in the longitudinal direction of the sheet P of the four images A arranged side by side along the width direction of the sheet P. Namely, in the juxtaposed images shown in FIG. 9A, the number (i.e., a juxtaposed image count) of images arranged in the last row (i.e., the row closest to the other-side end (i.e., the right end in FIG. 9A) in the longitudinal direction of the sheet P) is 2. The two images A arranged side by side along the width direction of the sheet P are placed closely to the one-side end (i.e., the lower end in FIG. 9A) in the width direction of the sheet P.

When determining in S21 that the images based on the original image data stored in the RAM 23 are the plurality of images B that form the plurality of pages (S21: Yes), the controller 10 generates juxtaposed image data for the juxtaposed images that are the plurality of images B arranged side by side along the width direction of the sheet P, and stores the generated juxtaposed image data in the RAM 23 (S24).

Figure 9B:
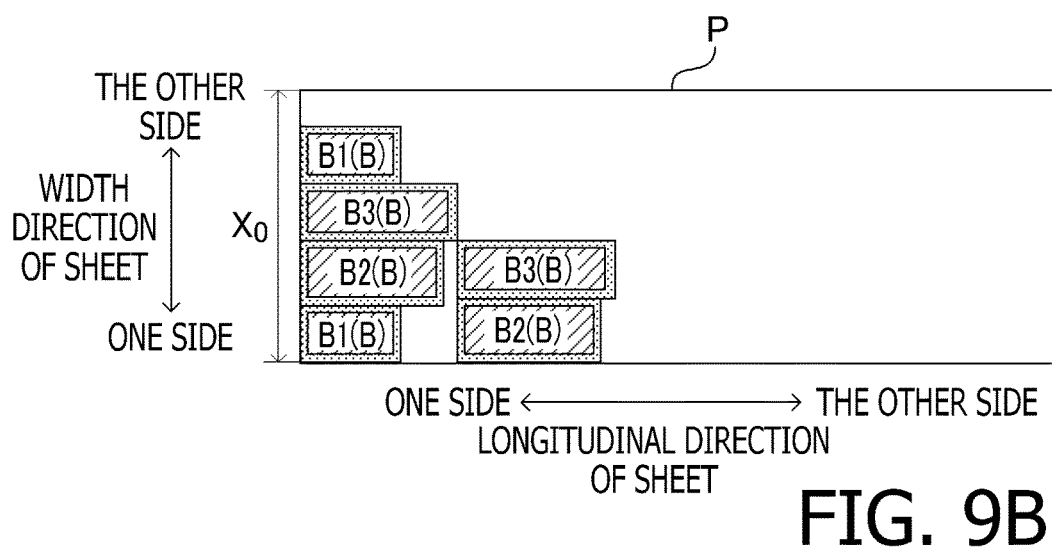
FIG. 9B shows juxtaposed images based on juxtaposed image data generated when the images based on the original image data are a plurality of images B forming a plurality of pages.

FIG. 9B shows an example in which the maximum juxtaposed image count is 4, and two copies of the set of three images B1, B2, and B3 are recorded. In this case, in the juxtaposed images, four images B are arranged side by side along the width direction of the sheet P, at a one-side end portion (i.e., a left end portion in FIG. 9B) in the longitudinal direction of the sheet P. More specifically, the image B1, the image B2, the image B3, and the image B1 are arranged in the said order from the one-side end (i.e., the lower end in FIG. 9B) in the width direction of the sheet P. The four images B arranged side by side along the width direction of the sheet P are placed closely to the one-side end (i.e., the lower end in FIG. 9B) in the width direction of the sheet P.

Then, the remaining two images B are arranged side by side along the width direction of the sheet P, at the other side (i.e., the right side in FIG. 9B), in the longitudinal direction of the sheet P, of the four images B arranged side by side along the width direction of the sheet P. Namely, in the juxtaposed images shown in FIG. 9B, the number (i.e., the juxtaposed image count) of images in the last row (i.e., the row closest to the other-side end (i.e., the right end in FIG. 9B) in the longitudinal direction of the sheet P) is 2. More specifically, the image B2 and the image B3 are arranged in the said order from the one-side end (i.e., the lower end in FIG. 9B) in the width direction of the sheet P. The two images B arranged side by side along the width direction of the sheet P are placed closely to the one-side end (i.e., the lower end in FIG. 9B) in the width direction of the sheet P.

Subsequently, the controller 10 determines whether the number (i.e., the juxtaposed image count) of the images juxtaposed in the last row, in the juxtaposed images based on the juxtaposed image data generated in S23 or S24, is less than n (S25). When determining that the juxtaposed image count of the last row is equal to n (S25: No), the controller 10 proceeds to an after-mentioned step S28. Meanwhile, when determining that the juxtaposed image count of the last row is less than n (S25: Yes), the controller 10 performs a dividing process to divide a single image C into n divisional images Cd (S26).

In the illustrative embodiment, n calculated in S6 is used in the dividing process of S26. However, when S26 is executed after execution of S24, n may be calculated again based on a width X of the image C for which the dividing process is performed.

In the dividing process, as described above, the single image C, in which (n−1) overlap margin areas 33 have been inserted in the overlap margin insertion process, is divided into n equal sections in the longitudinal direction of the sheet P. Thereafter, the controller 10 generates juxtaposition image data for the juxtaposed images that are the plurality of divisional images Cd arranged side by side along the width direction of the sheet P, and stores the generated juxtaposed image data in the RAM 23 (S27).

Figure 9C:
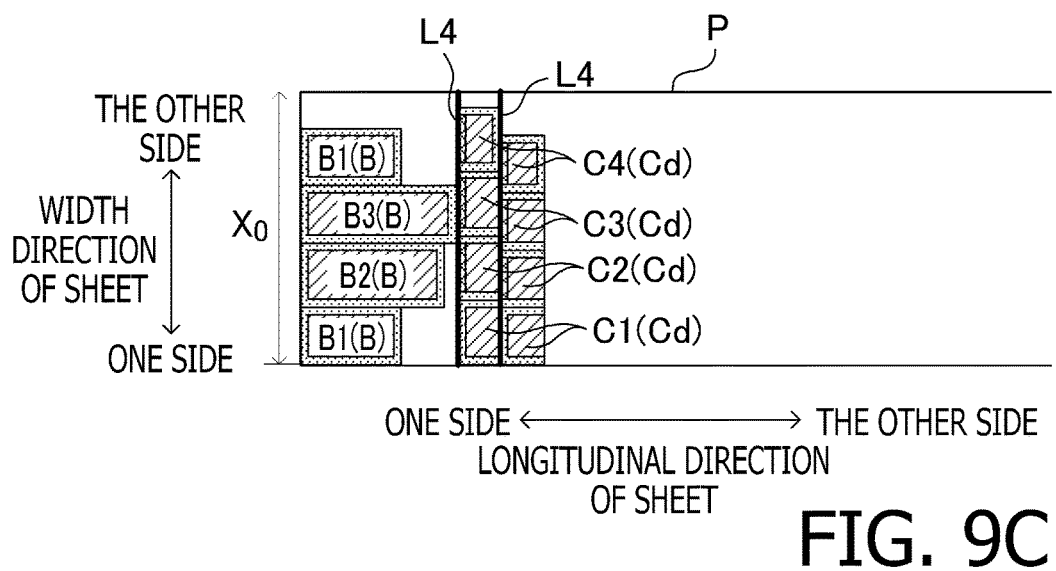
FIG. 9C shows an example in which the dividing process is performed for each of images B2 and B3 arranged side by side along a width direction of the sheet in FIG. 9B, and then a plurality of divisional images Cd are arranged side by side along the width direction of the sheet.

FIG. 9C shows an example in which the dividing process is performed for each of the images B2 and B3 arranged side by side along the width direction of the sheet P in FIG. 9B, and then a plurality of divisional images Cd are arranged side by side along the width direction of the sheet P. In this example, each of the images B2 and B3 is divided into four divisional images C1, C2, C3, and C4.

In the juxtaposed images, the divisional images C1, C2, C3, and C4 into which the image B2 has been divided are arranged side by side along the width direction of the sheet P, at the other side (i.e., the right side in FIG. 9C), in the longitudinal direction of the sheet P, of the four images B arranged side by side along the width direction of the sheet P. These four divisional images Cd are placed closely to the one-side end (i.e., the lower end in FIG. 9C) in the width direction of the sheet P.

Then, the divisional images C1, C2, C3, and C4 into which the image B3 has been divided are arranged side by side along the width direction of the sheet P, at the other side (i.e., the right side in FIG. 9C), in the longitudinal direction of the sheet P, of the divisional images C1, C2, C3, and C4 into which the image B2 has been divided. These four divisional images Cd are placed closely to the one-side end (i.e., the lower end in FIG. 9C) in the width direction of the sheet P.

Likewise, each of the two images A arranged side by side along the width direction of the sheet P in FIG. 9A may be divided into a plurality of divisional images.

In this case, these divisional images may be arranged side by side along the width direction of the sheet P.

When the juxtaposed image data for the juxtaposed images as shown in FIG. 9A or 9B is generated and stored in the RAM 23 in S23 or S24, juxtaposed image data for juxtaposed images as shown in FIG. 9C is generated and stored to overwrite the previous juxtaposed image data stored in the RAM 23.

Finally, the controller 10 controls the image recorder 7 to record the juxtaposed images on the sheet P based on the juxtaposed image data stored in the RAM 23 (S23). The sheet P on which the juxtaposed images are recorded in S28 is a sheet P cut by the cutter 6 along a cutting line L4 as shown in FIG. 9C. The user may cut the juxtaposed images recorded on the sheet P along the boundary line L3 (see FIGS. 5A-5C). Further, the plurality of divisional images Cd into which the image C has been divided may be, after being recorded, brought together as a single printed sheet by the user pasting the plurality of divisional images Cd together at the overlap margin areas 33.

As described above, the printer 1 of the illustrative embodiment is configured to perform image recording on the sheet P unwound from the roll body R. The printer 1 includes the RAM 23 to store the width of the sheet P, the image recorder 7 to perform image recording based on image data, and the controller 10. The controller 10 is configured to perform the calculation process. In the calculation process, the controller 10 calculates n that is the maximum natural number satisfying the relationship $nX \leq X_0$ among the natural numbers equal to or more than one. Here, $X_0$ represents the width of the sheet P that is stored in the RAM 23. Further, X represents the longest one of the respective length(s), in the width direction of the sheet P, of the plurality of images A or B, which are arranged along the longitudinal direction of the sheet P and separated by the cutting planned lines L1 along the width direction of the sheet P, or of the single image C. Further, the controller 10 is configured to perform the juxtaposed image recording process when n calculated in the calculation process is equal to or more than two. In the juxtaposed image recording process, the controller 10 controls the image recorder 7 in such a manner that two or more and n or less images, among the plurality of images A, the plurality of images B, or the plurality of divisional images Cd into which the image C has been divided by the dividing lines L2 along the width direction of the sheet P, are recorded to be arranged side by side along the width direction of the sheet P.

The aforementioned configuration enables the printer 1 to perform image recording in such a manner that the plurality of images A, the plurality of images B, or the plurality of divisional images Cd are arranged side by side along the width direction of the sheet P. Therefore, even when the length(s), in the width direction of the sheet P, of the images A, the images B, or the image C in the width direction of the sheet P are short, it is possible to reduce a wasted area (i.e., an area in which no image is recorded) on the sheet P.

Further, in the printer 1 of the aforementioned illustrative embodiment, when recording the plurality of images A that form the plurality of copies, the controller 10 controls the image recorder 7, in the juxtaposed image recording process, to perform image recording in such a manner that two or more and n or less images A, which are the same as each other, are arranged side by side along the width direction of the sheet P. Therefore, in recording the plurality of copies of the image A, it is possible to reduce a wasted area on the sheet P.

Further, in the printer 1 of the aforementioned illustrative embodiment, when recording the plurality of images B that form the plurality of pages, the controller 10 controls the image recorder 7, in the juxtaposed image recording process, to perform image recording in such a manner that two or more and n or less images B, of which any two adjacent images B in the width direction of the sheet P are for respective different pages, are arranged side by side along the width direction of the sheet P. Therefore, when the plurality of images B form the plurality of pages, it is possible to reduce a wasted area on the sheet P.

Further, in the printer 1 of the aforementioned illustrative embodiment, the controller 10 performs the dividing process to divide the single image C into n divisional images Cd by the dividing lines L2 along the width direction of the sheet P. Then, in the juxtaposed image recording process, the controller 10 controls the image recorder 7 to perform image recording in such a manner that the n divisional images Cd into which the single image C has been divided in the dividing process are arranged side by side along the width direction of the sheet P.

Further, in the printer 1 of the aforementioned illustrative embodiment, the controller 10 performs the overlap margin insertion process to place each of the (n−1) overlap margin areas 33 between adjacent two of the n divisional images C1, C2, ..., Cn into which the single image C has been divided in the dividing process. In the juxtaposed image recording process, the controller 10 controls the image recorder 7 to perform image recording in such a manner that each overlap margin area 33 is placed at one of the both ends of a divisional image Cd in the longitudinal direction of the sheet P. Therefore, it is possible to paste the plurality of divisional images Cd recorded, into which the image C has been divided, together at the overlap margin areas 33, thereby bringing the plurality of divisional images Cd together as a single printed sheet.

Further, in the printer 1 of the aforementioned illustrative embodiment, the controller 10 performs the dividing process to divide the single image C, in which the (n−1) overlap margin areas 33 have been inserted in the overlap margin insertion process, into n equal sections in the longitudinal direction of the sheet P. If the lengths of the n divisional images Cd in the longitudinal direction of the sheet P are different, when the n divisional images Cd are recorded to be arranged side by side along the width direction of the sheet P, a wasted area will be formed in adjacent area(s) to the divisional images Cd other than the longest divisional image Cd in the longitudinal direction of the sheet P. In contrast, according to the above configuration, the lengths of the n divisional images Cd in the longitudinal direction of the sheet P are the same. Therefore, it is possible to further reduce the wasted area on the sheet P.

Further, in the printer 1 of the aforementioned illustrative embodiment, in the juxtaposed image recording process, the controller 10 records the boundary lines L3 at the boundaries of two or more images (e.g., images A, images B, or divisional images Cd) arranged side by side along the width direction of the sheet P. Thus, it is possible to improve the workability of separating the images recorded on the sheet P at the boundary lines.

Further, the printer 1 of the aforementioned illustrative embodiment includes the touch panel type display 9. When n calculated in the calculation process is equal to or more than two, the controller 10 performs the notification process to cause the display 9 to display the notification screen 42 showing information that it is possible to perform image recording in such a manner that two or more images (e.g., images A, images B, or divisional images Cd) are arranged side by side along the width direction of the sheet P. Then, the controller 10 performs the juxtaposed image recording process in response to acceptance of the input of an instruction to perform image recording in such a manner that two or more images (e.g., images A, images B, or divisional images Cd) are arranged side by side along the width direction of the sheet P.

Further, the printer 1 of the aforementioned illustrative embodiment stores in the RAM 23 the original image data input from an external device. The controller 10 performs the capacity determination process to determine whether there is sufficient free space in the RAM 23. In addition, when determining that there is not sufficient free space in the RAM 23 in the capacity determination process, the controller 10 performs the stored data determination process to determine whether the original image data stored in the RAM 23 contains at least one page of images. Then, the controller 10 performs the juxtaposed image recording process when determining in the stored image determination process that the original image data stored in the RAM 23 contains at least one page of images. Meanwhile, the controller 10 does not perform the juxtaposed image recording process when determining in the stored image determination process that the original image data stored in the RAM 23 does not contain at least one page of images. Therefore, it is possible to determine whether to perform the juxtaposed image recording process according to the space capacity of the RAM 23.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the disclosure are provided below.

In the aforementioned illustrative embodiment, the example case where the printer 1 performs direct printing has been described. However, printing may be performed using the printer driver 54b installed in the PC 50. In this case, the PC 50 connected with the printer 1 may generate juxtaposed image data and send the generated juxtaposed image data to the printer 1.

In the aforementioned illustrative embodiment, the example case has been described in which when a plurality of copies of a set of images that form a plurality of pages are recorded (see e.g., the example shown in FIG. 9B), the pages contained in each copy are separated and arranged side by side along the width direction of the sheet P. However, aspects of the present disclosure are not limited to this case. Specifically, in another instance, the pages contained in each individual copy may not be separated but may be arranged side by side along the width direction of the sheet P.

In the aforementioned illustrative embodiment, the example case has been described in which the overlap margin area 33 is placed at the leading end of each of the divisional images C2, . . . , Cn, other than the divisional image C1 among the n divisional images C1, C2, . . . , Cn, which are arranged side by side along the width direction of the sheet P in the juxtaposed image recording process. However, aspects of the present disclosure are not limited to this case. Specifically, in another instance, each overlap margin area 33 may be placed at the trailing end of a corresponding divisional image Cd, as long as any two adjacent divisional images Cd are enabled to be pasted together. Moreover, in yet another instance, the overlap margin areas 33 may not be provided.

In the aforementioned illustrative embodiment, the example case has been described in which the lengths of the plurality of divisional images Cd in the longitudinal direction of the sheet P are the same as each other. However, aspects of the present disclosure are not limited to this case. In another instance, the lengths of the plurality of divisional images Cd in the longitudinal direction of the sheet P may be different from each other.

Further, in the aforementioned illustrative embodiment, the example case has been described in which the boundary lines L3 are recorded at the boundaries of two or more images (e.g., images A, images B, or divisional images Cd) arranged side by side along the width direction of the sheet P, in the juxtaposed image recording process. However, the boundary lines L3 may not be recorded.

Further, in the aforementioned illustrative embodiment, the example case has been described in which the printer 1 includes the touch panel type display 9, and when juxtaposed image recording process is executable, that information is displayed on the display 9, and the user is allowed to input an instruction regarding whether to perform the juxtaposed image recording process by operating the display 9. However, aspects of the present disclosure are not limited to this case. Specifically, in another instance, the printer 1 may be configured to provide a notification that the juxtaposed image recording process is executable, via a notification device (e.g., a speaker) other than the display 9. Further, the printer 1 may be configured to accept a user input of an instruction to perform the juxtaposed image recording process via a user interface device (e.g., a physical button) other than the display 9.

Further, in the aforementioned illustrative embodiment, the example case has been described in which the printer 1 is configured to perform the capacity determination process to determine whether there is sufficient free space in the RAM 23. However, aspects of the present disclosure are not limited to this case. Specifically, in another instance, when the printer 1 includes a storage device with a sufficient capacity for storing the original image data, or the PC 50 is configured to generate the juxtaposed image data, the printer 1 may not perform the capacity determination process.

Further, in the aforementioned illustrative embodiment, the example case has been described in which both the width of the sheet P on which image recording is performed and the original image data are stored in the RAM 23. However, aspects of the present disclosure are not limited to this case. In another instance, the width of the sheet P on which image recording is performed and the original image data may be stored in separate storage devices.

Aspects of the present disclosure may be applied to all image recording apparatuses configured to perform image recording on a sheet (i.e., roll paper) unwound from a roll body R. For instance, aspects of the present disclosure may be applied to not only inkjet printers but also laser-type electrophotographic printers configured to form an electrostatic latent image by exposing a photoconductive body with a laser, and LED-type electrophotographic printers configured to form an electrostatic latent image by exposing a photoconductive body with an LED. The recording medium on which image recording is performed is not limited to paper, but may be cloth or other types of media as long as it is a sheet-like medium.

The following shows examples of associations between elements illustrated in the aforementioned illustrative embodiment(s) and modification(s), and elements claimed according to aspects of the present disclosure. For instance, the printer 1 may be an example of an "image recording apparatus" according to aspects of the present disclosure. The image recorder 7 may be an example of a "print engine" according to aspects of the present disclosure. The RAM 23 may be an example of a "first storage device" according to aspects of the present disclosure. The RAM 23 may be an example of a "second storage device" according to aspects of the present disclosure. The display 9 may be an example of a "notification device" according to aspects of the present disclosure. The display 9 may be an example of a "user interface device" according to aspects of the present disclosure. The plurality of images A and the plurality of images B may be included in examples of "a plurality of first images" according to aspects of the present disclosure. The (single) image C may be an example of a "(single) second image" according to aspects of the present disclosure. The controller 10 may be an example of a "controller" according to aspects of the present disclosure. The CPU 21 may be an example of a "processor" according to aspects of the present disclosure. The ROM 22 may be an example of a "non-transitory computer-readable storage medium" according to aspects of the present disclosure. The image recording system 100 may be an example of an "image recording system" according to aspects of the present disclosure. In this case, the controller 10 of the printer 1 and the CPU 51 of the PC 50 may be included in examples of a "controller" of the "image recording system" according to aspects of the present disclosure. Further, in this case, the ROM 22 of the printer 1 and the HDD 54 of the PC 50 may be included in examples of a "non-transitory computer-readable storage medium" of the "image recording system" according to aspects of the present disclosure.

What is claimed is:
1. An image recording apparatus comprising:
a print engine configured to perform image recording on a sheet medium based on image data;
a first storage device configured to store a width of the sheet medium; and
a controller configured to:
calculate n that is a maximum natural number satisfying $nX \leq X_0$ among natural numbers equal to or more than one, wherein $X_0$ represents the width of the sheet medium that is stored in the first storage device, and X represents a longest one of respective lengths, in a width direction of the sheet medium, of a plurality of first images or a single second image based on the image data, the plurality of first images being arranged along a longitudinal direction of the sheet medium and separated by cutting planned lines along a width direction of the sheet medium; and when the calculated n is equal to or more than two, perform a juxtaposed image recording process to control the print engine in such a manner that two or more and n or less images, among the plurality of first images or among a plurality of divisional images into which the single second image is divided by dividing lines along the width direction of the sheet medium, are recorded to be arranged side by side along the width direction of the sheet medium.

2. The image recording apparatus according to claim 1, wherein the controller is further configured to, when recording the plurality of first images that form a plurality of copies, perform the juxtaposed image recording process to control the print engine in such a manner that two or more and n or less first images, which are the same as each other, are recorded to be arranged side by side along the width direction of the sheet medium.

3. The image recording apparatus according to claim 1, wherein the controller is further configured to, when recording the plurality of first images that form a plurality of pages, perform the juxtaposed image recording process to control the print engine in such a manner that two or more and n or less first images, of which any two adjacent images in the width direction of the sheet medium are for respective different pages, are recorded to be arranged side by side along the width direction of the sheet medium.

4. The image recording apparatus according to claim 1, wherein the controller is further configured to:
   divide the single second image into n divisional images by the dividing lines along the width direction of the sheet medium; and
   perform the juxtaposed image recording process to control the print engine in such a manner that the n divisional images, into which the single second image has been divided, are recorded to be arranged side by side along the width direction of the sheet medium.

5. The image recording apparatus according to claim 4, wherein the controller is further configured to:
   insert (n−1) overlap margin areas in such a manner that each overlap margin area is placed between a corresponding couple of adjacent divisional images in the longitudinal direction of the sheet medium among the n divisional images into which the single second image has been divided; and
   perform the juxtaposed image recording process to control the print engine in such a manner that each overlap margin area is placed at one of two ends, in the longitudinal direction of the sheet medium, of a corresponding divisional image among the n divisional images into which the single second image has been divided.

6. The image recording apparatus according to claim 5, wherein the controller is further configured to divide the single second image, into which the (n−1) overlap margin areas have been inserted, equally into the n divisional images.

7. The image recording apparatus according to claim 1, wherein the controller is further configured to record boundary lines at boundaries of two or more images arranged side by side along the width direction of the sheet medium, among the plurality of first images or the n divisional images into which the single second image has been divided.

8. The image recording apparatus according to claim 1, further comprising:
   a notification device; and
   a user interface device,
   wherein the controller is further configured to:
      when the calculated n is equal to or more than two, cause the notification device to provide a notification that it is possible to perform image recording in such a manner that two or more images, among the plurality of first images or the n divisional images into which the single second image has been divided, are arranged side by side along the width direction of the sheet medium; and
      perform the juxtaposed image recording process in response to acceptance of an instruction to perform image recording in such a manner that two or more images, among the plurality of first images or the n divisional images into which the single second image has been divided, are arranged side by side along the width direction of the sheet medium.

9. The image recording apparatus according to claim 1, further comprising a second storage device configured to store the image data,
   wherein the controller is further configured to:
      determine whether there is sufficient free space in the second storage device;
      in response to determining that there is not sufficient free space, determine whether the image data stored in the second storage device contains at least one page of images;
      in response to determining that the image data stored in the second storage device contains at least one page of images, perform the juxtaposed image recording process; and
      in response to determining that the image data stored in the second storage device does not contain at least one page of images, not perform the juxtaposed image recording process.

10. The image recording apparatus according to claim 1, wherein the controller comprises:
   a processor; and
   a non-transitory computer-readable storage medium storing computer-readable instructions configured to, when executed by the processor, cause the controller to:
      calculate n that is the maximum natural number satisfying $nX \leq X_0$ among the natural numbers equal to or more than one; and
      when the calculated n is equal to or more than two, perform the juxtaposed image recording process.

11. An image recording system comprising:
   a print engine configured to perform image recording on a sheet medium based on image data;
   a storage device configured to store a width of the sheet medium; and
   a controller configured to:
      calculate n that is a maximum natural number satisfying $nX \leq X_0$ among natural numbers equal to or more than one, wherein $X_0$ represents the width of the sheet medium that is stored in the storage device, and X represents a longest one of respective lengths, in a width direction of the sheet medium, of a plurality of first images or a single second image based on the image data, the plurality of first images being arranged along a longitudinal direction of the sheet medium and separated by cutting planned lines along a width direction of the sheet medium; and when the calculated n is equal to or more than two, perform a juxtaposed image recording process to control the print engine in such a manner that two or more and n or less images, among the plurality of first images or among a plurality of divisional images into which the single second image is divided by dividing lines along the width direction of the sheet medium, are recorded to be arranged side by side along the width direction of the sheet medium.

12. The image recording system according to claim 11, wherein the controller comprises:
   a processor; and
   a non-transitory computer-readable storage medium storing computer-readable instructions configured to, when executed by the processor, cause the controller to:
      calculate n that is the maximum natural number satisfying $nX \leq X_0$ among the natural numbers equal to or more than one; and
      when the calculated n is equal to or more than two, perform the juxtaposed image recording process.

13. A non-transitory computer-readable storage medium storing computer-readable instructions executable by a controller of an image recording system, the image recording system comprising a print engine configured to perform image recording on a sheet medium based on image data, and a storage device configured to store a width of the sheet medium, the instructions being configured to, when executed by the controller, cause the image recording system to:
   calculate n that is a maximum natural number satisfying $nX \leq X_0$ among natural numbers equal to or more than one, wherein $X_0$ represents the width of the sheet medium that is stored in the storage device, and X represents a longest one of respective lengths, in a width direction of the sheet medium, of a plurality of first images or a single second image based on the image data, the plurality of first images being arranged along a longitudinal direction of the sheet medium and separated by cutting planned lines along a width direction of the sheet medium; and
   when the calculated n is equal to or more than two, perform a juxtaposed image recording process to control the print engine in such a manner that two or more and n or less images, among the plurality of first images or among a plurality of divisional images into which the single second image is divided by dividing lines along the width direction of the sheet medium, are recorded to be arranged side by side along the width direction of the sheet medium.

* * * * *